United States Patent
Quach et al.

(10) Patent No.: US 10,523,755 B1
(45) Date of Patent: Dec. 31, 2019

(54) PEER-BASED CLOUD STORAGE FOR MEDIA BROADCASTS

(71) Applicant: Amazon Technologies, Inc., Reno, NV (US)

(72) Inventors: Anderson Kaailodge Quach, Seattle, WA (US); Matthew Liang Chaboud, San Francisco, CA (US); Shah Pavel Jamal, Seattle, WA (US); Donald John Darling, Jr., Sunnyvale, CA (US); Kyke Daniel Halbach, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 15/046,342

(22) Filed: Feb. 17, 2016

(51) Int. Cl.
*H04L 29/08* (2006.01)
*H04L 29/06* (2006.01)

(52) U.S. Cl.
CPC ...... *H04L 67/1097* (2013.01); *H04L 65/4076* (2013.01); *H04L 67/06* (2013.01); *H04L 67/104* (2013.01)

(58) Field of Classification Search
CPC ............. H04L 67/1097; H04L 65/4076; H04L 67/104; H04L 67/06
USPC ........................................................ 709/217
See application file for complete search history.

(56) References Cited

U.S. PATENT DOCUMENTS

| | | | |
|---|---|---|---|
| 2012/0233668 A1* | 9/2012 | Leafe | G06F 9/44526 726/4 |
| 2013/0151581 A1* | 6/2013 | Leggette | H04L 67/10 709/201 |
| 2013/0198328 A1* | 8/2013 | Green | H04L 67/02 709/217 |
| 2013/0238876 A1* | 9/2013 | Fiske | G06F 3/0641 711/216 |
| 2014/0129618 A1* | 5/2014 | Panje | H04N 21/26258 709/203 |
| 2014/0189051 A1* | 7/2014 | Hunter | H04L 67/32 709/217 |
| 2014/0207850 A1* | 7/2014 | Bestler | G06F 17/30 709/203 |
| 2014/0237614 A1* | 8/2014 | Irvine | G06F 21/6218 726/26 |
| 2014/0304357 A1* | 10/2014 | Bestler | G06F 17/30 709/213 |
| 2014/0372491 A1* | 12/2014 | Ross | H04L 67/1095 707/822 |

(Continued)

*Primary Examiner* — Philip J Chea
*Assistant Examiner* — Wing Ma
(74) *Attorney, Agent, or Firm* — Hogan Lovells US LLP

(57) ABSTRACT

The recording of broadcast media can be performed by a network storage service even where a client is unable to provide a full copy of the media file. For example, a client might want to record a television broadcast by transmitting the content to a remote storage service. For a high definition format, however, the upload limitations of the data connection may prevent the full content from being uploaded from that client. Accordingly, clients recording the same content and using the same service can upload respective segments of the content, with each segment being provided by at least one of the clients and available for subsequent download. At least some of those clients can also store some of the segments such that those clients can act as peer sources for obtaining those segments.

20 Claims, 7 Drawing Sheets

(56) References Cited

U.S. PATENT DOCUMENTS

| | | | | |
|---|---|---|---|---|
| 2015/0324379 A1* | 11/2015 | Danovitz | ............ | H04N 21/2743 |
| | | | | 707/825 |
| 2016/0021170 A1* | 1/2016 | Mosko | .................... | H04L 67/10 |
| | | | | 709/217 |
| 2016/0057226 A1* | 2/2016 | Bestler | ................ | G06F 11/1076 |
| | | | | 709/217 |
| 2016/0073175 A1* | 3/2016 | Phillips | .............. | H04N 21/2402 |
| | | | | 725/34 |
| 2016/0191509 A1* | 6/2016 | Bestler | .................... | G06F 3/067 |
| | | | | 713/163 |
| 2016/0366198 A1* | 12/2016 | Jennings | ............. | H04L 65/4076 |
| 2017/0006314 A1* | 1/2017 | Danovitz | ............ | H04L 67/1097 |
| 2017/0055012 A1* | 2/2017 | Phillips | .................. | H04L 67/06 |
| 2017/0171611 A1* | 6/2017 | Nair | .................. | H04N 21/2362 |
| 2017/0193003 A1* | 7/2017 | Vijayan | ................ | G06F 11/1662 |
| 2017/0195718 A1* | 7/2017 | Nair | .................... | H04N 21/4408 |
| 2017/0235647 A1* | 8/2017 | Kilaru | ................ | G06F 11/1464 |
| | | | | 707/652 |
| 2017/0353516 A1* | 12/2017 | Gordon | ............. | H04N 21/8456 |

\* cited by examiner

PEER-BASED CLOUD STORAGE FOR MEDIA BROADCASTS

Users are increasingly turning to Internet-based applications and functionality to perform various tasks. For example, users are increasingly using network-based storage, or "cloud" storage, to backup and store files and data. It can be particularly desirable to store large content files such as images, audio files, and video files where the devices used to access those files might have relatively limited storage. A downside to such an approach is due to the fact that the network access available to many users is asymmetric, in that the download speeds are relatively fast but the upload speeds can be relatively slow. If the user wants to upload a high quality video stream for storage, such as would be similar to a network-based digital video recorder (DVR), it may be difficult or in some cases impossible to upload the data at a rate that will allow the entire broadcast to be stored in the network without, for example, running out of storage or buffer on the device.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the management of content to be stored for a variety of different users. In particular, various embodiments enable users to upload portions, segments, or "chunks" of a file, such as may correspond to a broadcast stream to be recorded, to a network storage system or service. The chunks from the various user devices can be stored such that those user devices can obtain an entire copy of the recording by downloading the appropriate segments. At least one manifest can be maintained, at the clients and/or by the network storage service, that provides information about the chunks for the file. When those user devices request to playback the file, chunks can be obtained from the network storage service, from local storage if available, or from another peer in a peer group having recorded the broadcast. The selection can be based upon various factors, such as the quality of the chunk that can be delivered by each respective source at current network traffic levels and workloads, etc. The selection can also be based at least in part upon a hash value of the chunk, as a noisy broadcast might result in different hash values than a broadcast without noise, etc. The ability to upload only certain chunks of the video enables users to cause a broadcast to be recorded even if the upload bandwidth (or other resources) allocated to the user is insufficient to upload an entire high quality broadcast as the broadcast is being transmitted.

Various other functions can be implemented within the various embodiments as well as discussed and suggested elsewhere herein.

Figure 1:
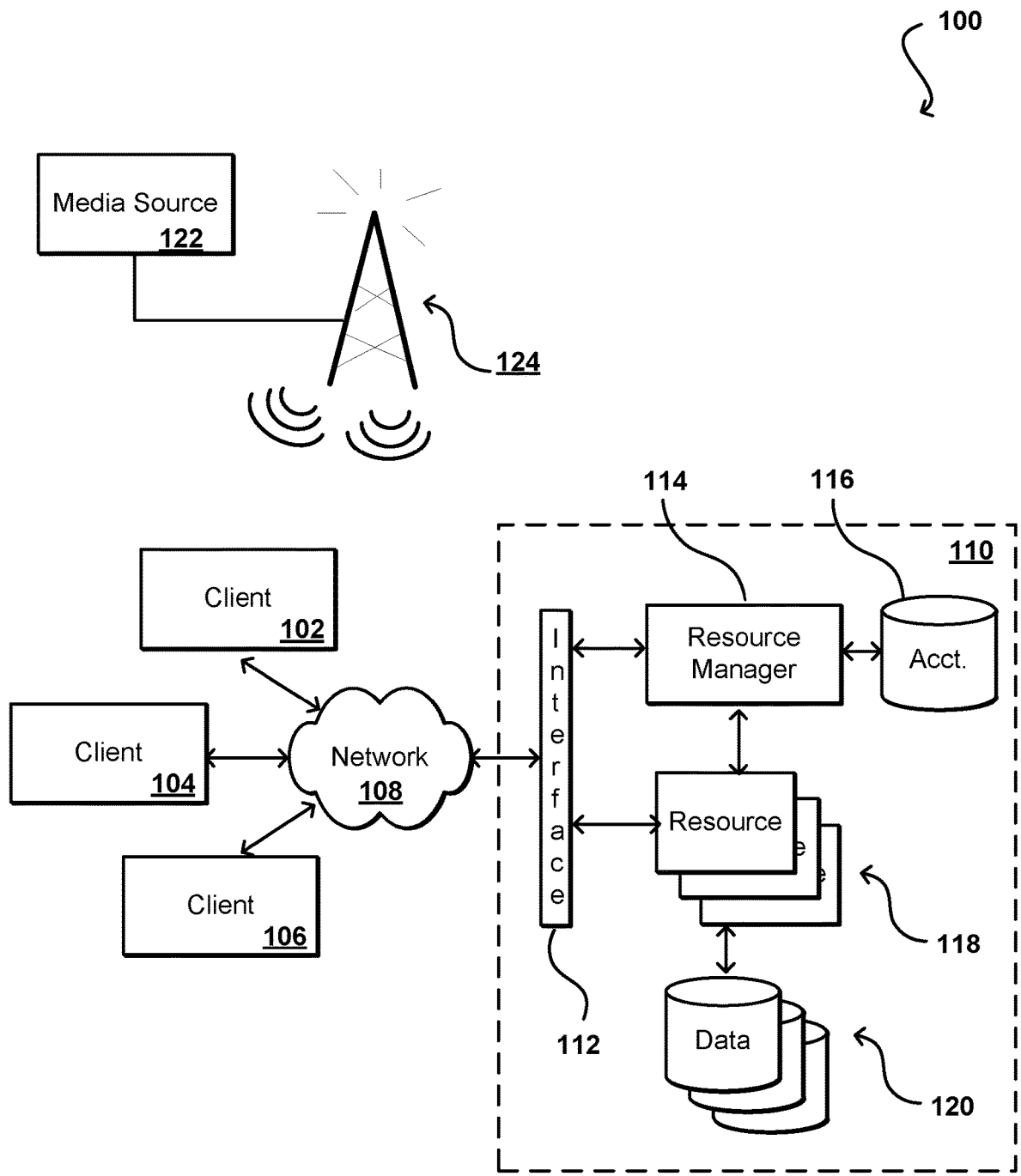
FIG. 1 illustrates an example environment in which various embodiments can be implemented.

FIG. 1 illustrates an example environment 100 in which aspects of the various embodiments can be implemented. In this example, a media source 122, such as may provide a television stream, podcast, live video feed, or other such data stream, provides content to a broadcast source 124, such as a public broadcaster, streaming audio or video service, and the like, who can cause the content to be streamed, transmitted, or otherwise provided in such a way as to be received by various client devices 102, 104, 106. The broadcast can be sent over any appropriate network or transmission medium, as may include a television signal, a radio signal, an Internet transmission, a cable network connection, a cellular network connection, and the like. The client devices can be any appropriate device, such as a computing device (e.g., a laptop, smartphone, smart watch, or tablet), set top box, network transceiver, and the like. Each client device is able to receive the broadcast using an appropriate receiving system, and in at least some embodiments is able to provide a presentation of the content, such as through a display, projector, speaker or other such mechanism. Each client also has a network connection, or is associated with a device with a network connection, that is able to cause content to be transmitted across at least one wired and/or wireless network, such as the Internet, a local area network, a cellular network, a cable network, and the like.

In this example, each of the clients illustrated has an account or other relationship with a network service provider, or resource provider, whereby the clients 102, 104, 106 are each able to upload content to be stored in a data store 120 of a resource provider environment 110. The clients are also able to download or otherwise access the content from the resource provider environment upon request. In at least some embodiments there may be restrictions on the amount and/or type of content that can be stored, as may be determined at least in part by the terms of the relationship.

In this example a user is able to utilize one of the client devices 102 to submit requests across the at least one network 108 to the resource provider environment 110. As mentioned the request can be a request to upload, modify, or download content, among other such options. This can include, for example, broadcast content that is received by the client device 102 and then uploaded to the resource provider environment 110 for storage. The resource provider environment 110 can include any appropriate components for receiving requests, storing content, and returning content or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment (or multi-tenant environment) is often referred to as resource sharing, Web services, or "cloud computing," among other such terms and depending upon the specific environment and/or implementation. In this example the provider environment includes a plurality of resources 118 of one or more types. These types can include, for example, application servers operable to process instructions provided by a user, content servers operable to receive and provide content, or database servers operable to process data stored in one or more data stores 120 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 120 can submit a request that is received to an interface layer 112 of the provider environment 110. The interface layer can include application programming interfaces (APIs) or other exposed interfaces enabling a user to submit requests to the provider environment. The interface layer 110 in this example can also include other components as well, such as at least one Web server, routing components, load balancers, and the like. When a request to provision a resource is received to the interface layer 110, information for the request can be directed to a resource manager 114 or other such system, service, or component configured to manage user accounts and information, resource provisioning and usage, and other such aspects using data from an account data store 116. A resource manager 114 (or other associated component, system, or service) receiving the request can perform tasks such as to authenticate an identity of the user submitting the request, as well as to determine whether that user has an existing account with the resource provider, where the account data may be stored in at least one data store 120 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 114, at least until such time as a relevant aspect of the user account changes, the user is no longer granted access to the resource, or another such aspect changes.

The resource manager 114 (or another such system or service) in this example can also function as a virtual layer of hardware and software components that handles control functions in addition to management actions, as may include provisioning, scaling, replication, etc. The resource manager can utilize dedicated APIs in the interface layer 112, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

The use of such an environment for uploading high quality content streams, such as video broadcasts in high definition, 4K, or 8K format, can be less than optimal for at least some users. While broadband Internet connectivity has currently reached almost 75% of homes in the United States, as an example, upload speeds tend to be restricted by the Internet service providers (ISPs) and customers thus have limited bandwidth to upload large media files to network storage, particularly at speeds necessary for near-real time high definition recordings of TV shows and other such broadcasts. While it would be possible in some situations to have one client device with sufficient bandwidth upload a copy that can be shared amongst all users, various regulations, customer agreements, and other such rules or guidelines require a customer to have a customer-specific copy of the data and/or provide their own copy of the data.

Accordingly, approaches in accordance with various embodiments can enable a client device to upload only specific segments, chunks, or portions of a media file, such that the upload is within the capabilities of the client device and/or network connection used for the upload. Such uploading can also help to demonstrate that the client has access and/or rights to the particular file in some embodiments. A small chunk of the data file can initially be uploaded to the network storage service by at least one of the clients, in order to coordinate the starting location (or time) of each chunk. In some embodiments the starting points can be designated using timestamps, since in at least some embodiments the clients will be receiving the same timestamps. Information can then be supplied to the various clients that can enable a number (fixed or otherwise) of customers, users, client devices, or other such entities to contribute specific chunks, segments, or portions of the broadcast to be stored separately by the resource provider network. These chunks can be assembled into one or more copies of the content in the network provider environment, in some embodiments, as may be part of a network-based media recording service or other such offering. In at least some embodiments, the chunks can be stored separately but accessed as appropriate to obtain a complete playback of the broadcast. The determination of segments for each client, and the clients able to participate for a particular broadcast or transmission of content, can be determined by a media stream manager or content recording manager of a data storage service, among other such options. In at least some embodiments, a customer can participate in such a process for a particular stream when the customer has an active session for the broadcast or has specified a particular broadcast to be recorded or captured, where the customer has access and/or storage rights for that broadcast. Each chunk can have a hash value, based on the content of the chunk, to ensure that each client is obtaining the proper version of the content. The client and/or remote storage service can generate a manifest that includes information for each chunk, such as the order and appropriate hash value for each chunk, in order to facilitate playback of the broadcast media file.

Figure 2:
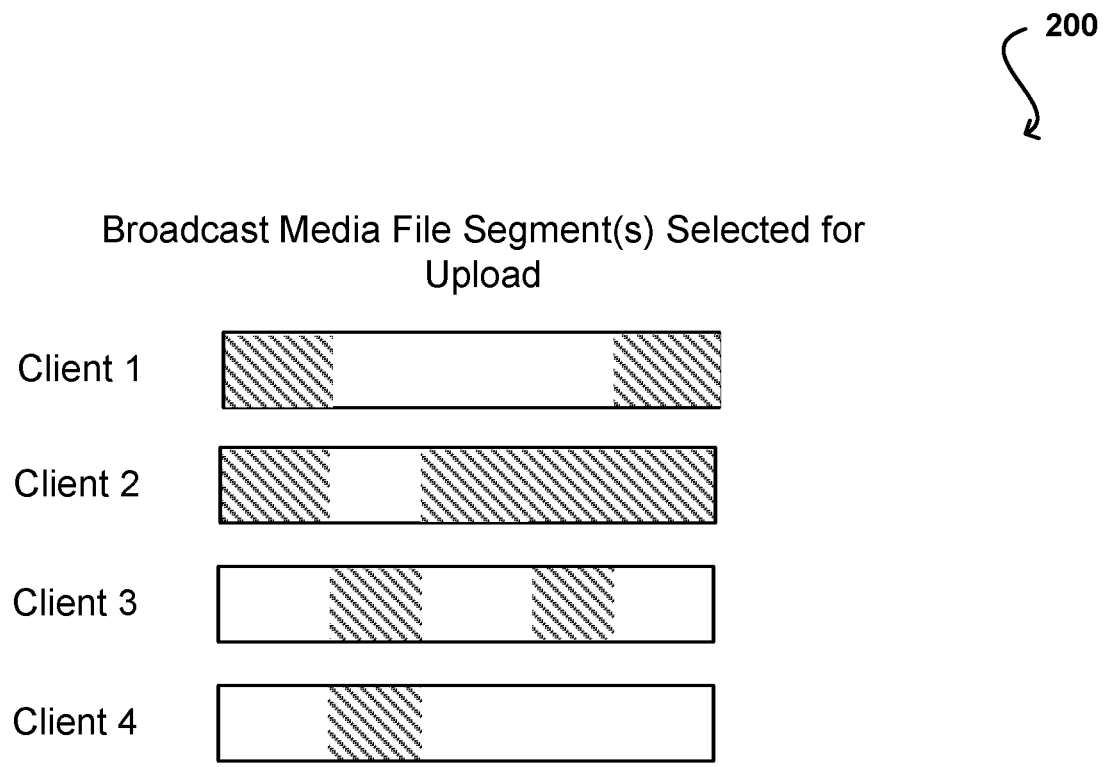
FIG. 2 illustrates example segments of a broadcast file that can be uploaded by various network peers in accordance with various embodiments.

FIG. 2 illustrates an example approach 200 that can be utilized for a particular content broadcast in accordance with various embodiments. In this example, clients 1-4 have requested to have a particular content broadcast be recorded, or have a copy stored, by a network storage service. As mentioned, each client can store a local copy of the content, at least temporarily, and in at least some embodiments the clients can transcode the recording to a more space efficient format. Each client can also be caused to chunk the data into smaller segments, either during or after the broadcast. Each chunk can have a hash generated based on the content of that chunk. Information such as the chunking byte offset and hash values can be written to a manifest for the respective client, which can be stored on the client or by the network storage service, among other such options.

During or after the broadcast, or even potentially before in some embodiments, each of the clients can communicate with the remote storage service to determine which, if any, of the chunks the client should upload in order to have a network or "cloud"-based copy of the broadcast stored on behalf of the client. The number and/or selection of chunks to be uploaded by a given client can be based upon a number of factors, such as available bandwidth, type of device, average upload speed, and the like. This information can be obtained explicitly from a user or other such source, or determined implicitly by monitoring performance of the client when uploading content over time, among other such options. In some embodiments a single client might be selected as a master client to provide an entire version of the broadcast, or at least act as a single source of a full set of segments or chunks for the file. The content file can be identified in a number of different ways in order to correlate similar content recording requests among the various clients, such as may include the broadcast channel, title, content descriptor, stream identifier, or other such information.

Each of the clients can coordinate with the remote storage service to determine which chunks should be uploaded by that client. As illustrated in the figure, this can include varying numbers of segments which in some embodiments can be of different sizes, although in this embodiment the chunks are of similar sizes for ease of management. The number of chunks to be uploaded by any particular client may depend at least in part upon the capabilities of the client device and/or network connection. The segments can be selected at random by the client device or specified by an upload or recording manager, among other such options. The segments uploaded should be sufficient such that at least one copy of each of the chunks for the content is obtained for the broadcast content. Thus, if there are only a few participating clients then a managing component might beneficially provide specification of the sections to upload in order to ensure that all the segments of the overall content file are obtained from at least one source. If there are a large number of clients, the clients may be allowed to upload segments of the content at random, as statistically it is likely that at least one of the clients will upload each segment of the content. An upload manager or other such component can monitor the uploads and if a chunk has already been successfully uploaded then another client selected to upload that chunk may no longer have to upload that chunk, assuming a similar hash or other such value(s), in order to conserve resources and bandwidth. In some embodiments an upload manager might always request that multiple clients upload a given chunk in order to compensate for the fact that connection errors or other issues might prevent a single chunk from being properly uploaded from only a single client device. In some embodiments the upload manager might also attempt to obtain and store at least one redundant copy for each chunk, as may be stored at various locations (i.e., edge servers) across the network.

In FIG. 2, Client 1 uploads two chunks, as does Client 3. Client 4 only uploads a single chunk, as the connection or other capabilities of Client 4 may be less than that of Clients 1 and 3. Client 2 uploads the most segments, which can be due to factors such as Client 2 having the highest bandwidth or throughput. Other factors may be considered as well, such as data limits, data charges, geographic location, past upload quality, and the like. As illustrated, in this example most if not all segments can have at least two clients selected to upload the chunk. Since some of the uploading can occur during the broadcast and some after the broadcast, no redundant copy may be selected if a proper copy is already obtained. For example, one of the chunks uploaded by Client 2 does not have another upload source selected because the chunk was successfully received from Client 2, such that another copy may not be required in at least some embodiments.

In some embodiments there might be a minimum size to the chunk or amount of data uploaded, etc. As mentioned, in some embodiments the remote storage service will determine the locations of the chunks, which will then be the same for all of the clients. In at least some embodiments the chunks and hashes should be the same for all of the clients. As mentioned, however, there may be some amount of noise or other differences that may be captured by some of the clients, but the occurrence of such noise or differences should be minimal. In at least some embodiments the hash values can be tracked for the clients such that if the broadcast received by that client had noise then the version played back can include that noise as well. In some embodiments segments can be merged into at least one backup or client-specific copy, although in other embodiments the chunks will be stored separately such that such merging is not warranted. In some embodiments, at least some of the segments can be stored in locations that are most appropriate for the general location of the user or client, such that overall network bandwidth is and latency are reduced, for example.

Figure 3:
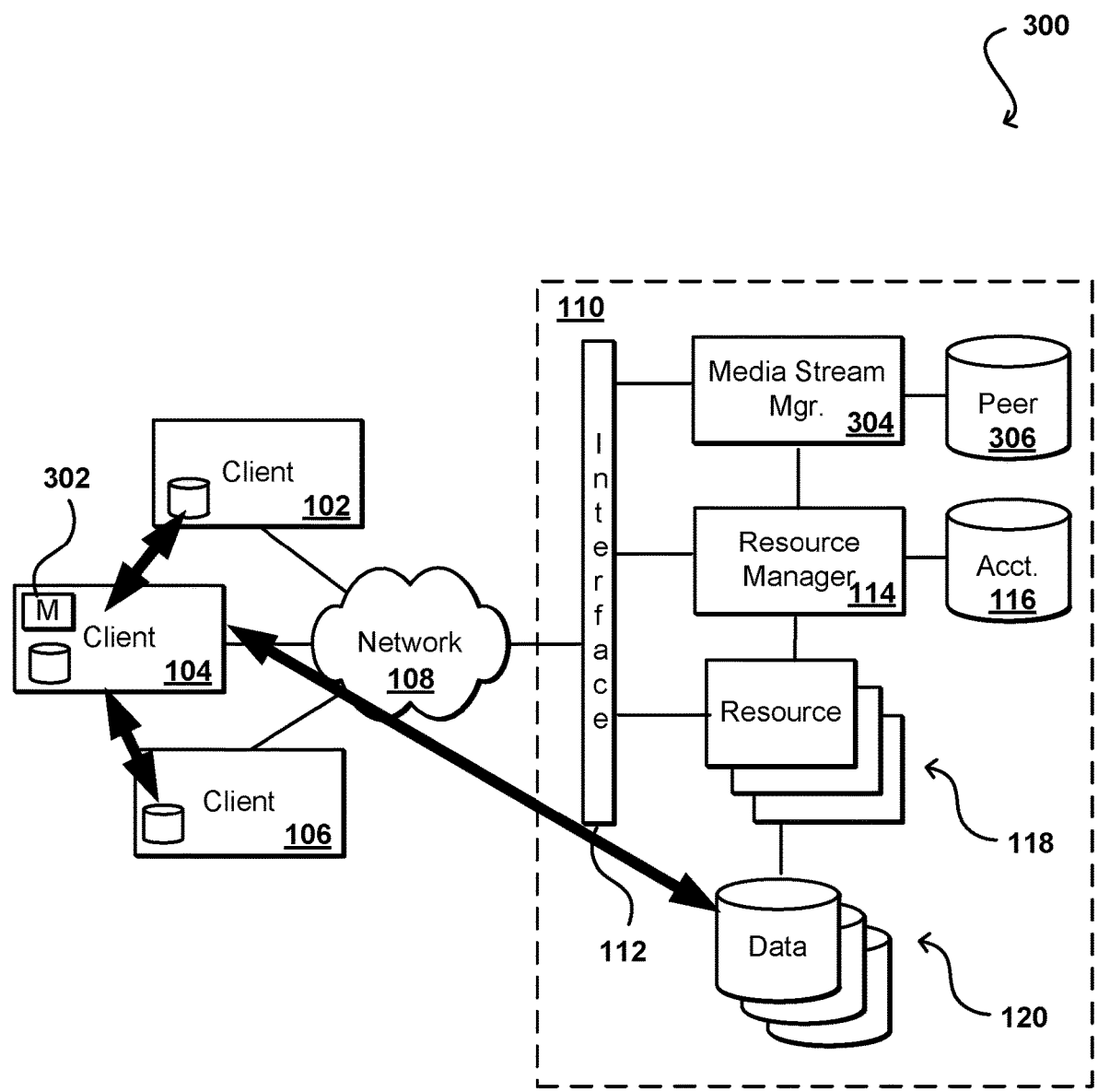
FIG. 3 illustrates an example of sources from which a peer can access segments of an uploaded broadcast file that can be utilized in accordance with various embodiments.

After the segment(s) are uploaded by each client, or after at least a minimum or specified amount is uploaded in some embodiments, the client (or another client associated with the user or account) can access the media file from one or more locations. As illustrated in the example configuration 300 of FIG. 3, a client 104 requesting the content can submit a request across the at least one network to the resource provider environment 110, whereby a media stream manager 304 or other such component can initiate a transfer of the chunks of content from an appropriate data repository 120 in (or accessible to) the resource provider environment. It should be noted that reference numbers for similar elements are carried over between figures for simplicity of explanation, but such usage should not be interpreted as a limitation on the scope of the various embodiments unless otherwise specifically stated.

In this example, the content begins transfer from a first chunk stored by the resource provider environment, such as by a network storage service. It might be the case, however, that due to the load on the network storage or bandwidth constraints between the service and the client, for example, that the quality of service that might be deliverable from the network storage service may not meet minimum quality of service criteria, which could result in pauses in the playback or other potentially undesirable issues occurring at the client device. Accordingly, the media stream manager can attempt to locate other sources from which the content can be delivered to the client with at least the minimum required quality of service.

As known for many network or "cloud" based systems, there can be multiple servers with access to the content that can potentially be used to improve the quality of transmission. It might be the case, however, that even such flexibility may not be sufficient to meet quality of service requirements. Accordingly, approaches in accordance with various embodiments can enable the client to potentially obtain at least some of the chunks or segments of the file from one or more other clients, or peers, in a peer group associated with the content.

In this example, the media stream manager 304 and/or each client can maintain a manifest, mapping, or other collection of data, as may be stored in a peer data store 306 or other such location, of chunks that were uploaded by specific client devices, as well as potentially which client devices still store copies of those chunks on local storage. Knowledge about clients with specific chunks stored locally can enable those segments to be provided from other peers in the peer group. For example, if a first segment is available from a first peer client 102 then the requesting client peer 104 can potentially obtain that segment from the first client peer instead of from the network storage service. Similarly, if a second segment is available from a second peer client 106 then the requesting peer client 104 can potentially obtain the second segment from the second peer client. If a segment is available from both the first and second peer clients, then a selection can be made based upon factors such as the peer client which can deliver the highest quality of service as well as the respective load, capacity, or capability of the respective clients. In at least some embodiments, the media stream manager 304 can obtain near real time status data for the various peers, and can make dynamic selections based at least in part upon the quality of service that can be provided for a particular segment of a file to be transmitted. In other embodiments, general characteristics can be stored for each potential source, and this information can be updated as new information is obtained, such as a segment no longer being available or a client no longer belonging to the peer group, among other such options. As an example, a client might only have access rights to the content for a limited period of time, after which the client can no longer access or provide segments of the file.

The client 104 can also have software 302 installed that can help to manage the receiving and playback of the various segments. This can include, for example, providing seamless playback of the content even when the stream or source of the content changes during the playback. In some embodiments it is possible that the segments may not be aligned exactly, such as where different providers of the same content might have different timing codes or offsets, or where there might be slight differences in the timing of the content, among other such options. Thus, the software on the client 104 might have to do some frame matching, audio matching, or other such process for determining where the files overlap so that the playback can continue at the appropriate point from the other source. The software in some embodiments can also be responsible for communicating with the media stream manager 304 to determine the source of the next segment(s) in order to ensure that an appropriate connection is established or request for the segment sent, etc. In some embodiments the software can also store information about the peers in the peer group to attempt to obtain the next segment (or start the obtaining of segments) even if the network storage service is unavailable, or if the client is instead on a peer network. As mentioned, the client 104 can also potentially store one or more of the segments of the file in a local data store, for example, such that the client can provide the segment(s) to other peers in the peer group as instructed. In at least some embodiments the client can send a request to the media stream manager, in response to receiving a request for content from another peer, to ensure that the peer is authorized to receive the content. In other embodiments, an instruction might be received from the media stream manager that indicates the client 104 is to send the segment to a specific peer in the peer group, among other such options.

Figure 4:
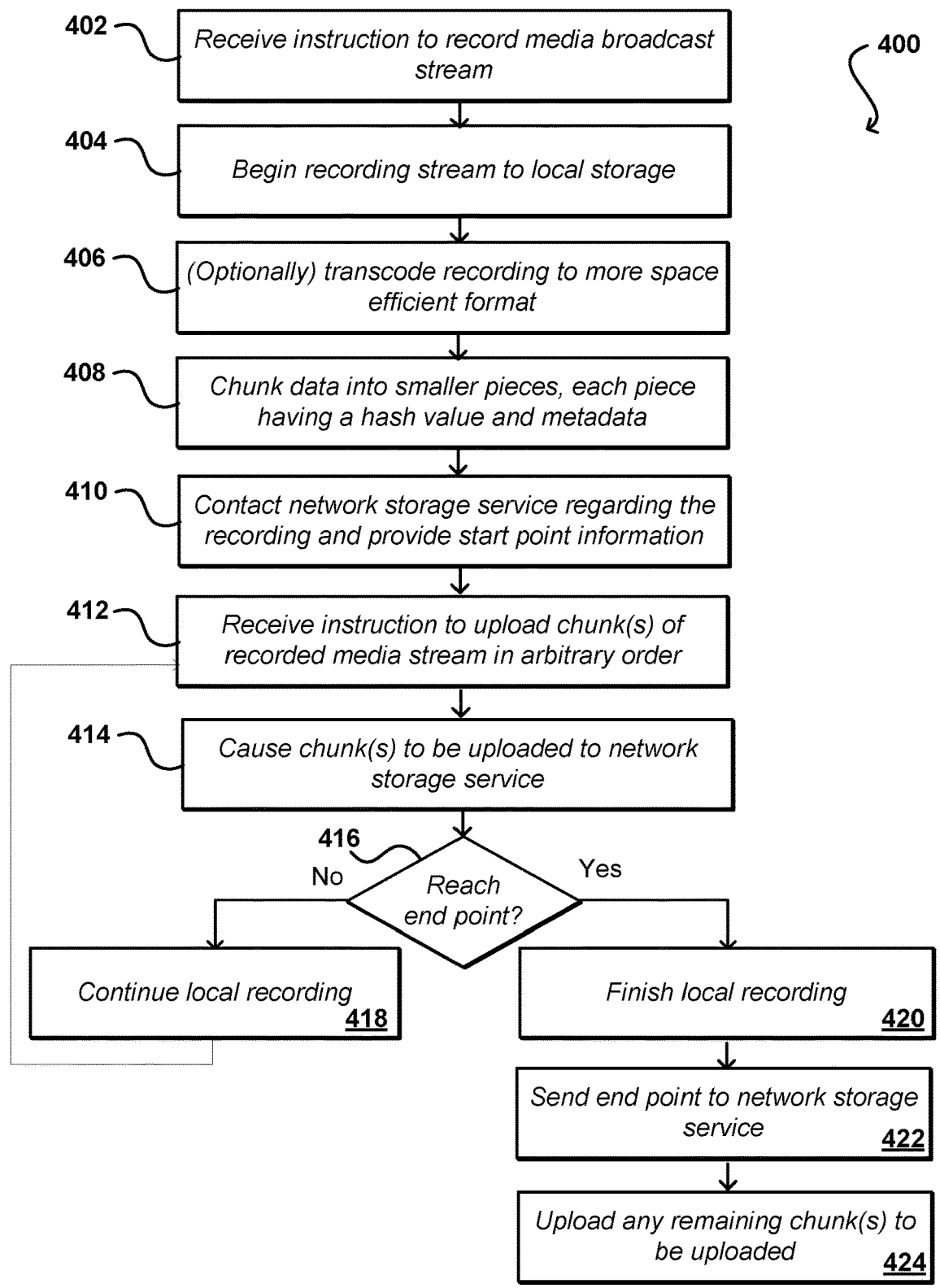
FIG. 4 illustrates an example process for enabling a client device to trigger a network storage-based recording of a broadcast by uploading one or more segments of the broadcast that can be utilized in accordance with various embodiments.

FIG. 4 illustrates an example process 400 for enabling a client device to only upload one or more segments, chunks, or portions of a broadcast file to be recorded that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, an instruction to record a media broadcast stream is received 402, such as to a client device that is to receive the broadcast stream. The instruction can come from any appropriate source, such as a human user, a digital video recorder application or box, a network storage service, and the like. In response to the instruction, the client device can establish a connection or otherwise prepare to receive the broadcast, such as by tuning to the appropriate channel, opening the appropriate port, etc. The client device can then begin recording 404 the broadcast or media stream to local storage. This can include, for example, writing the content to a hard drive or other such storage that enables the content to be available from the storage for at least a period of time. In other embodiments, this can include temporarily storing the content to a cache or buffer until the content is able to be transmitted to a remote storage service or other such recipient. As discussed elsewhere herein, segments that are not to be uploaded by a client in some embodiments can be either purged from the cache or not written to local cache, among other such options.

In some embodiments, the client device can be caused to transcode 406 the recording to a more space efficient format, such as one that allows for faster uploading and/or requires less disk space for storage. This can include, for example, transcoding from an H.262 video coding format to an H.264 video coding format, among other such options. The different codecs can come with different types of compression, among other such differences. In at least some embodiments, each client transcodes to the same format in order to provide for consistent hashing, playback quality, and other such aspects. The client can also chunk 408 the data file into smaller pieces, which in some embodiments will all be of similar size or byte count. The chunking of the data can be performed during and/or after the recording of the broadcast in various embodiments. The chunking byte offset can be synchronized across all clients such that the clients are generating essentially the same chunks of the broadcast file. In some embodiments this includes one or more clients uploading a small chunk of the data to a network storage service in order to determine where chunks should be created, with timestamps in the recorded data being used where each client views the same (or similar) timestamps. Each chunk can have a corresponding hash value based on the content of the chunk. A selected hashing algorithm (i.e., SHA-256 or SHA-512) can be used to generate the hash values, with each client using the same hashing algorithm. Each chunk can also include metadata including information about the respective chunk. This can include, for example, information as to whether the chunk was transcoded, the type of transcoding used, source identifiers, and the like. The metadata in some embodiments can comprise a header to a particular chunk file. Due to the similar chunk locations and hashing algorithms, the clients recording the broadcast should have similar if not the same hash values and chunks, although due to noise and other disruptions as discussed herein a given client's chunks may have subtly different content compared to that of another client recording the broadcast. The efficiency of the overall system can be affected by these differences, such that in at least some embodiments it can be desirable for the noise to be relatively infrequent to allow for the sharing of specific chunks between clients. Noise can result in different hash values, which can result in different versions of the chunks having to be maintained for various clients.

A network storage service (or other such component or system) can be contacted 410 to provide information such as the type and identity of the content, if not previously provided, as well as the time or location at which the stream was initially received or marked for recording. For example, if a user indicated ahead of time that a program was to be recorded starting at a certain time, then the start time or the beginning of the content can be provided as the location from which the content should be available. If a user instead initiated a live recording at a certain time or location in the broadcast, that information can be provided in order to determine which portion of the content to store or allocate for the user, as well as the portion(s) to which the user might have access rights, among other such information. In some embodiments the information can also include a time or location for the end of the recording, if available. For example, a preset recording may have an end time specified by the user or a content provider, but for a live recording the end time might be determined at some point in the future by a user manually ending the recording session, among other such options.

Based at least in part upon the timing information and capacity or capability information for the client device, as well as other clients receiving and/or recording the same content, a network storage service or other such system or component can determine one or more chunks of the broadcast to be uploaded by the client device. One or more instructions then can be received 412 to the client device to indicate the chunk(s) that are to be uploaded by the client device, as well as other appropriate information such as an address or connection to use to upload the chunk (s), a type or quality of data to be transmitted, etc. As mentioned, the determinations can be made throughout the upload process in order to attempt to ensure that the chunks are received from appropriate sources, and that all the chunks are received from at least one source. Further, the chunks to be uploaded by a particular client can be uploaded in any order, in order to allow for variations in the upload process. For example, a first chunk might take longer to upload than a second chunk based on network conditions, so it can be advantageous to not require that the chunks be received or stored in a particular order. In embodiments where chunks can be uploaded in an arbitrary order, it can be advantageous to have a manifest for each chunk in order to ensure the appropriate information is provided. Further, the inclusion of a manifest for each chunk enables the network storage service to not have to understand or analyze the various chunks. In response, the client device can cause 414 the appropriate chunk (s) to be uploaded to the network storage service at an appropriate time, such as when received, as a stream redirect, at a time after receipt, or at any time up to a time specified by the network storage service, such that the client can upload the data at a time convenient for the client and at a rate allowable by the network connection or other such factors. A determination can be made 416 as to whether a recording of the broadcast has reached an end point. An endpoint can result when, for example, the broadcast finishes, a scheduled recording time or length reaches an end, or a cloud manager sends an instruction to end the recording, among other such options. Instructions to end can be received from other sources as well, such as a nearest neighbor, executing application, etc. If an end point has not been reached, the local recording 418 by the client can continue and the client may receive instructions to upload or provide additional segments of the content. If it is determined that an end point has been reached, the client can finish 420 local recording and information about the actual stop point can be sent 422 to the network storage service, at least if the stop point differs from a point previously indicated in some embodiments. Any remaining chunk(s) can be uploaded 424 after the recording has completed. As mentioned, any chunks that were successfully uploaded by another client may not have to be uploaded by this particular client, such that any client selecting to upload chunks after the recording may not have to upload any segments if those segments have already been received from other sources. This can help to further reduce the load on client devices with limited resources or capabilities, and can increase the amount of content provided by higher capability clients, etc. In at least some embodiments, a client verifying that a chunk has been successfully received by the remote storage service can delete the local copy of that chunk, among other such options.

Figure 5:
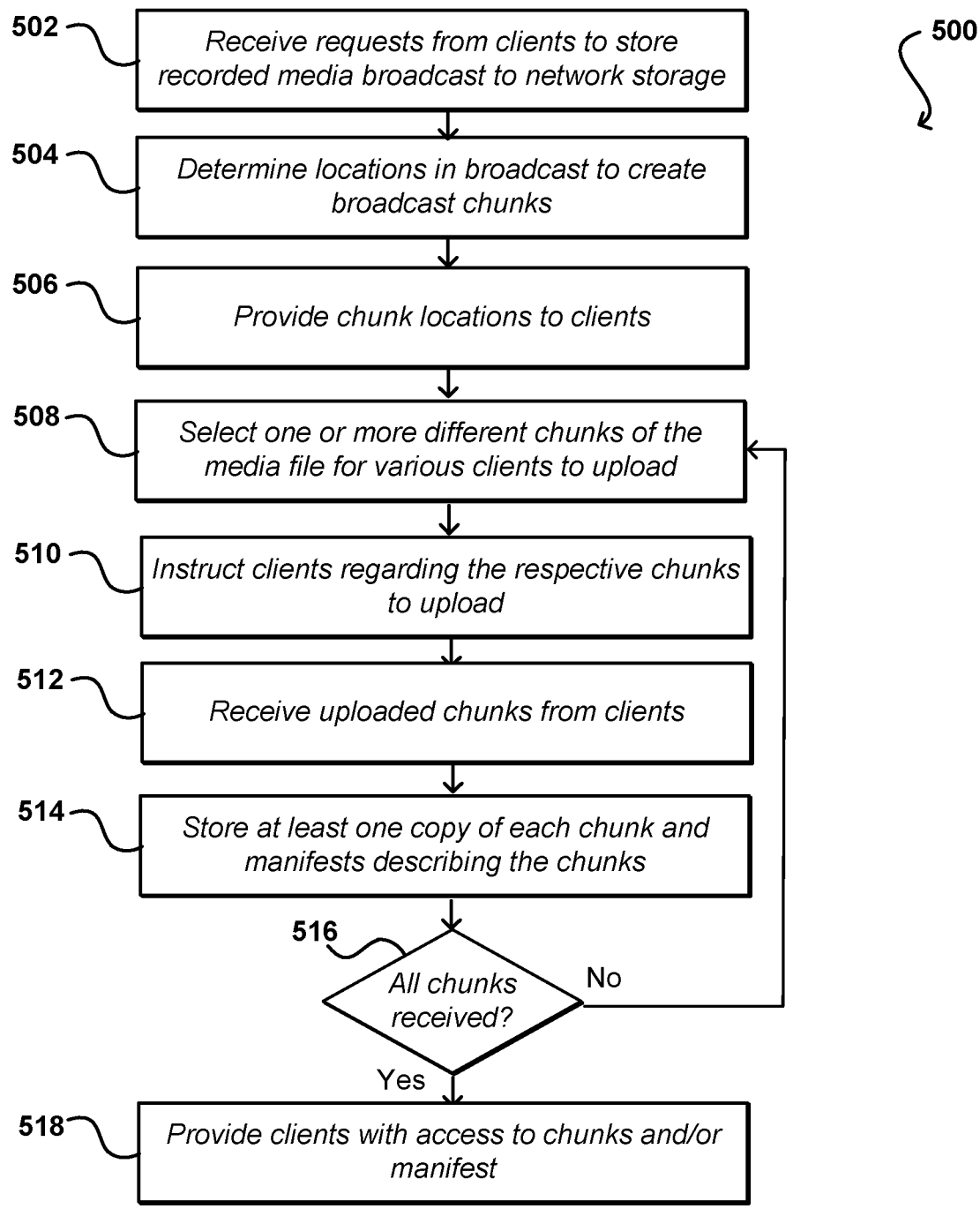
FIG. 5 illustrates an example process for instructing clients to upload specific segments of a broadcast that can be utilized in accordance with various embodiments.

FIG. 5 illustrates an example process 500 for obtaining segments from multiple clients and assembling those segments into a complete media presentation that can be utilized in accordance with various embodiments. This process can be performed by a network storage service or cloud recording system, among other such systems and services. In this example, requests to store content corresponding to a broadcast or stream of media or other such content can be received 502 from a variety of client devices or other such sources. In response, the network storage service can determine 504 locations (or offsets) in the broadcast at which to create broadcast chunks, each corresponding to a segment of the broadcast and including a hash of the content, although other such chunks can be created as well in other embodiments. Information about the chunk locations or offsets can then be provided 506 to the clients requesting to record the broadcast.

For the broadcast, the network storage service or other system can select 508 one or more different chunks to be uploaded by various devices of the requesting client devices. In some embodiments this can include requesting upload of one or more chunks from each client device or one or more chunks from a subset of the devices, among other such options. The network storage service can instruct 510 the relevant clients as to the chunk(s) to be uploaded by those clients. If a client is not to upload any chunks, that client might not receive any requests or might receive a notification that no chunks will be required for upload, in case the client would like to delete any cached copies of the chunk(s), etc.

During and/or after the broadcast, the various chunks and their manifests will be received 512 from the selected clients. At least a subset of the segments can then be stored 514 at one or more appropriate locations. The network storage service can also store manifest data for the clients to assist with the delivery of recorded content to those devices (or associated devices). In at least some embodiments there will be a manifest stored for each client, stored by the network storage service and/or the clients themselves. A manifest for a client in some embodiments can include at least information such as a catalog of the chunks (i.e., chunk identifiers) along with their respective hash values for that client, among other such options. As mentioned, in some embodiments each chunk can have its own manifest that makes the chunk uniquely identifiable. In some embodiments there can be duplication of uploaded segments, such that only one of those redundant segments (i.e., a highest quality copy or copy of specified quality) might be selected. In some embodiments the broadcast might be available in different formats, such as a standard definition and a high definition version of a television broadcast. In at least some embodiments these can be treated as separate broadcasts so that the necessary segments are obtained and stored for each version. As mentioned, in some embodiments where noise affected one or more client versions there can be different chunks stored as well. Because different clients may start and stop recording at different times, network conditions may change, and some chunks may not be uploaded successfully, among other such options, the selection of chunks to be uploaded can occur throughout the broadcast and/or upload process, and may not be a single decision made at a specific time. In at least some embodiments the decisions can be made, updated, or adjusted until all chunks are successfully uploaded by at least one source. If chunks are still remaining 516, the process can continue and additional or alternative upload sources can be selected as appropriate. One all the chunks are received and stored, or at least a majority or threshold number of the chunks as discussed elsewhere herein, those chunks can be provided 518 for access by the appropriate client(s). It should be understood that additional chunks can be made available as well, such as for purposes of redundancy or placing copies at various locations across the network.

Figure 6:
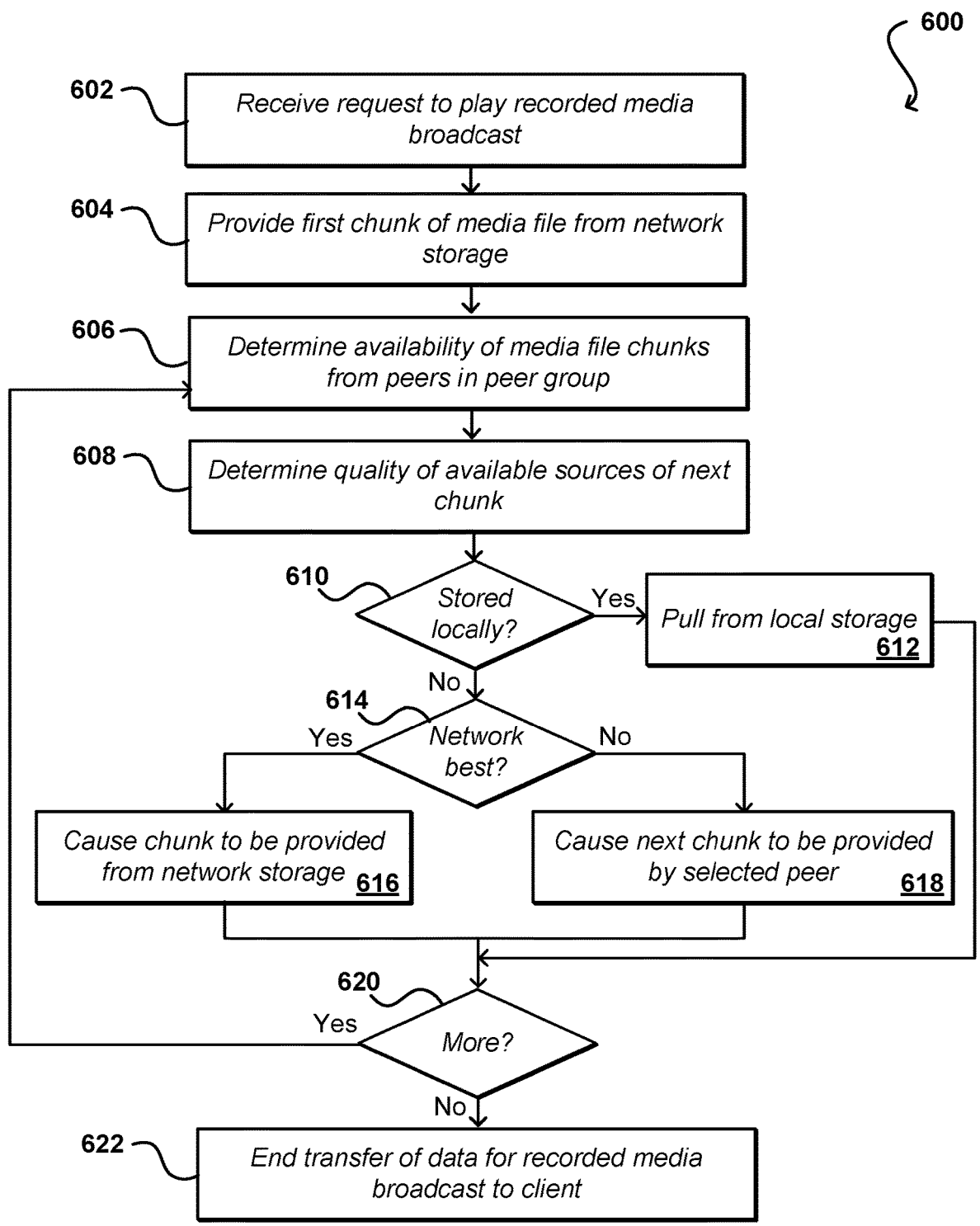
FIG. 6 illustrates a process for enabling a client device to download segments of recorded broadcast content from a network or set of peers that can be utilized in accordance with various embodiments.

FIG. 6 illustrates an example process 600 for selecting sources to provide different chunks of a recorded broadcast file, to be used for playback on a client device, that can be utilized in accordance with various embodiments. In this example, a request to play content corresponding to a recorded media broadcast or content stream can be received 602, such as to a playback manager on a client device or a content manager of a network storage service, among other such systems and components. In this example, a first segment of the media file can be provided 604 from network storage in order to provide a low latency experience, although in other embodiments a determination can be made as to a source for the first segment, among other such options. The first segment can depend at least in part upon the location where that particular client started recording in at least some embodiments, client does not otherwise have rights to the entire content. In other embodiments the client might indicate to start at a particular location, such as where the client last left off, at a location of interest to the user, etc. The remote storage service in some embodiments may transcode the recording to a more space efficient format before sending the chunks to the client for playback.

Concurrently with serving the first chunk of the media file in this example, a determination can be made 606 as to the availability of chunks corresponding to that media file from other peers in a peer group for that media content. The chunks can be determined according to the manifest specific to that client as discussed elsewhere herein. The peers can include, for example, client devices that uploaded specific chunks of the recorded audio and may still store copies of at least some of those chunks. A quality determination can also be made 608 for each of those client devices, such as to determine any bandwidth, throughput, quality, capacity, or other limitations or capabilities of those devices. In some embodiments this can also include a determination as to whether an uploaded chunk was transcoded or otherwise modified. A determination can be made 610 as to whether an acceptable copy is stored locally to the client, such as in memory or on local hard disk. If so, the next chunk can be pulled 612 from local storage. If an acceptable chunk is not stored locally and it is determined 614 that the network storage is the best option to provide the next chunk, or at least meets or exceeds certain criteria with respect to the available peer options, then the next chunk can be caused 616 to be provided from network storage. In some embodiments the chunk will always be provided from the network storage service unless it is determined that the providing may not be able to meet certain minimum criteria, in order to reduce load on the client devices and help encourage users to allow their client devices to be used as peers for such purposes. In some embodiments a peer source will only be selected over the network source if the peer source will be able to provide a substantially better experience, such as where the network source is unable to provide a playback experience without excessive frame drops or periods of buffering, etc. If it is decided that the network source is not the best source, at least considering the various criteria discussed and suggested elsewhere herein, then the next chunk can be caused 618 to be provided by a selected peer of the peer group. As mentioned, different peers might be selected to provide different segments of the content based upon changes in network conditions, client load, or other such circumstances. If the chunk to be provided was transcoded, that chunk can optionally be transcoded (or returned to the previous state) before or after transferring that chunk to the client. If there are more chunks to be obtained 620, then the process can continue. Otherwise, the transfer of content or data can be ended 622 for the purposes of media playback. In at least some embodiments, information about the quality of chunks received from various sources can be analyzed or provided to a peer manager or other such system or service in order to update peer data for use in selecting sources for future segments. For example, if a chunk was no longer located on a client or was unable to be obtained satisfactorily, that client might be removed from the list of possible content sources. Alternatively, if a client suddenly has much greater capacity or performance, that client might get pushed higher up in the ranking or selection of possible content sources. Various other updates and analyses can be used as well, as would be apparent to one of ordinary skill in the art in light of the teachings and suggestions contained herein.

In some instances it might be the case that a chunk is not available from any appropriate source. In such situations, a interstitial or other piece of content may be provided or displayed to indicate that the chunk could not be obtained. In some embodiments certain chunks might not be selected for upload. These can include, for example, commercial breaks where different commercials are displayed for different regions or markets. Instead of uploading and storing copies of each commercial played in that spot, the system may choose to not upload any chunks for that period. Upon playback, an option could be provided to provide advertising content from another source, skip the commercial break entirely, or perform another such action. In some embodiments a flag might be included in the broadcast that indicates the start and end of such breaks.

In some embodiments, a network storage device and/or peer manager may have the ability, and authorization, to periodically probe peer devices in a peer group or part of a particular network. This can help to determine which content segments are stored, as well as where those segments are stored. This can also help to determine factors such as device and network capabilities, network connections, etc. This can help to determine a network topology, and machine learning or other such processes can be used to update and analyze the topology based on factors such as route traversal and peer traffic, etc. As various devices reach out to different servers from trace routes, a sparse view of their routing topology can be determined based on several signals, such as the IP addresses, blocked addresses or connections, relative pings to respective servers, and the like. Using a sparse model, for example, the service can adapt predictively the locations from which segments can optimally be obtained.

Figure 7:
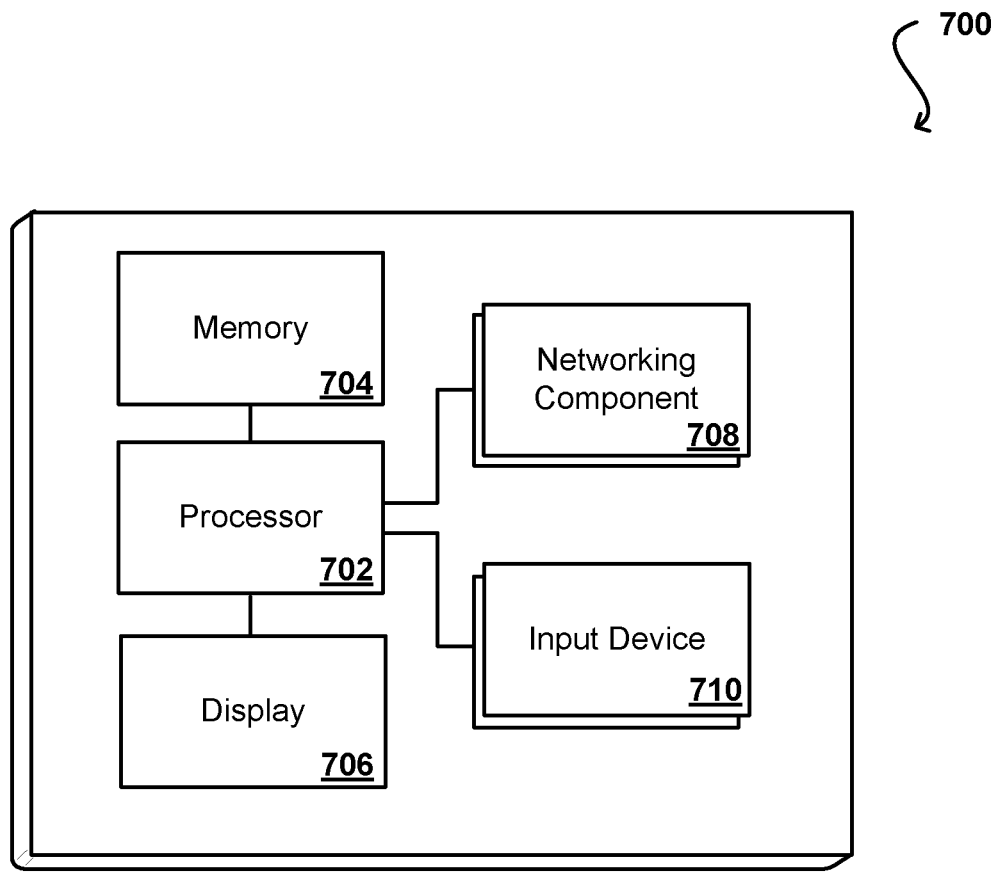
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, at a content storage system, a respective request from each of a plurality of client devices to record a media broadcast stream;
determining a series of chunking offsets for the media broadcast stream, each chunking offset defining a respective segment of the media broadcast stream;
providing the series of chunking offsets to the plurality of clients for purposes of generating a series of chunks each containing the respective segment of the media broadcast stream, each chunk further containing a hash generated using data for the respective segment;
determining, for each chunk of the series of chunks and based at least in part upon respective capabilities of the plurality of client devices, one or more client devices of the plurality of client devices to upload the chunk to the content storage system;
storing at least one copy of each chunk received from the one or more client devices;
causing a set of manifests to be stored for the plurality of client devices, each manifest indicating information for at least one chunk of the series of chunks, the information including the respective hash value for the chunk;
receiving, from a determined client device of the plurality of client devices, a download request to download the media broadcast stream for playback on the determined client device;
causing a first chunk of the media broadcast stream, determined using the at least one manifest, to be transcoded into a more space efficient format;
causing the first chunk to be downloaded to the determined client device from the content storage system if the first chunk is not already locally stored by the determined client device;
determining, for each additional chunk of the series of chunks for the media broadcast stream that is not already locally stored by the determined client device, whether to cause the additional chunk to be provided to the determined client device from the content storage service or from another client device of the plurality of client devices storing a copy of the additional chunk, at least a subset of the client devices in the plurality functioning as peers; and
causing, for each additional chunk of the media broadcast stream, the additional chunk to be pulled from local storage or to be provided to the determined client device from the content storage service or another client device storing a copy of the additional chunk.

2. The computer-implemented method of claim 1, further comprising:
causing the series of chunks to be transcoded into a more space efficient format before causing the series of chunks to be uploaded from the determined client device.

3. The computer-implemented method of claim 1, further comprising:
receiving, at the content storage system, an initial chunk for the media broadcast stream; and
determining the series of chunking offsets based at least in part upon data from the initial chunk.

4. The computer-implemented method of claim 1, further comprising:
instructing a client device to not upload a specified chunk if a valid copy of the chunk, having a corresponding hash value, is already stored by the content storage system.

5. The computer-implemented method of claim 1, further comprising:
determining that an additional chunk of the media broadcast stream is not available to be provided to the determined client device; and
causing an interstitial page to be displayed in place of the additional chunk on the determined client device.

6. A computer-implemented method, comprising:
receiving a first request from a first client device to record a broadcast stream;
determining a set of chunks corresponding to the broadcast stream, each chunk including a respective segment of the broadcast stream and a respective hash value;
determining a first subset of the set of chunks for the first client device to upload based at least in part upon capabilities of the first client device;
causing the first client device to upload at most the first subset of the set of chunks corresponding to the broadcast stream, a second subset of the set of chunks being provided from other client devices of a plurality of client devices for which the broadcast stream is being recorded;
causing a plurality of manifests to be stored for the broadcast stream, the manifests including information for the set of chunks for the broadcast stream;
receiving, from the first client device, a second request to download the broadcast stream;
causing the set of chunks to be transcoded into a more space efficient format; and
causing, according to at least a subset of the plurality of the manifests, chunks of the set of chunks to be downloaded to the first client device where those chunks are not already stored locally by the first client device.

7. The computer-implemented method of claim 6, further comprising:
receiving, from a second client device of the plurality of client devices, a third request to download the broadcast stream;

determining, for each chunk of the set of chunks corresponding to the broadcast stream, whether the chunk is stored locally by the second client device; and causing, according to the plurality of manifests, chunks of the set of chunks that are not stored locally to be downloaded to the second client device.

8. The computer-implemented method of claim 6, further comprising:

determining a set of chunking offsets for the set of chunks; and providing the set of chunking offsets to the plurality of client devices, the plurality of client devices including the first client device.

9. The computer-implemented method of claim 6, further comprising:

causing each chunk of the set of chunks to be transcoded to a more space efficient format before causing the set of chunks to be uploaded from, or downloaded to, the plurality of client devices.

10. The computer-implemented method of claim 6 further comprising:

maintaining at least two versions of a specified chunk for the broadcast stream, each version having a different hash value based on a respective segment of the broadcast stream having different recorded data for each version.

11. The computer-implemented method of claim 6, wherein the capabilities of the first client device include at least one of a capacity, a bandwidth, or a throughput associated with the first client device.

12. The computer-implemented method of claim 6, further comprising:

determining, for each additional chunk of the broadcast stream that is not stored locally by the first client device, whether to cause the additional chunk to be downloaded to the first client device from a network storage service or whether to cause the additional chunk to be provided from another client device, of the plurality of client devices, storing a copy of the additional chunk; and causing, for each additional chunk of the broadcast stream that is not stored locally by the first client device, the additional chunk to be provided to the first client device.

13. The computer-implemented method of claim 12, further comprising:

maintaining a respective manifest for each chunk of the set of chunks, each respective manifest including a respective hash value and metadata for the chunk.

14. The computer-implemented method of claim 6, wherein the broadcast stream includes at least one of a television broadcast, a multimedia broadcast, an audio broadcast, or a data broadcast.

15. The computer-implemented method of claim 6, further comprising:

comparing at least one quality factor for a stored copy of a specific chunk and an uploaded copy of the specific chunk; and causing the uploaded copy to become a new stored copy of the specific chunk if the at least one quality factor for the uploaded copy is higher than for the stored copy.

16. A computer system, comprising:

at least one processor; and memory including instructions that, when executed by the at least one processor, cause the computer system to:

receive a first request from a first client device to record a broadcast stream;

determine a set of chunks corresponding to the broadcast stream, each chunk including a respective segment of the broadcast stream and a respective hash value;

determine a first subset of the set of chunks for the first client device to upload based at least in part upon capabilities of the first client device;

cause the first client device to upload at most the first subset of the set of chunks corresponding to the broadcast stream, a second subset of the set of chunks being provided from other client devices of a plurality of client devices for which the broadcast stream is being recorded;

cause a plurality of manifests to be stored for the broadcast stream, the manifests including information for the set of chunks for the broadcast stream;

receive, from the first client device, a second request to download the broadcast stream;

cause the set of chunks to be transcoded into a more space efficient format; and cause, according to at least a subset of the plurality of the manifests, chunks of the set of chunks to be downloaded to the first client device where those chunks are not already stored locally by the first client device.

17. The computer system of claim 16, wherein the instructions when executed further cause the computing system to:

determine a set of chunking offsets for the set of chunks; and provide the set of chunking offsets to the plurality of client devices, the plurality of client devices including the first client device.

18. The computer system of claim 16, wherein the capabilities of the first client device include at least one of a capacity, bandwidth, or throughput associated with the first client device.

19. The computer system of claim 16, wherein the instructions when executed further cause the computing system to:

determine, for each additional chunk of the broadcast stream not stored locally by the first client device, whether to cause the additional chunk to be downloaded to the first client device from a network storage service or whether to cause the additional chunk to be provided from another client device, of the plurality of client devices, storing a copy of the additional chunk; and cause, for each additional chunk of the broadcast stream not stored locally by the first client device, the additional chunk to be provided to the determined client device.

20. The computer system of claim 16, wherein the instructions when executed further cause the computing system to:

determine that an additional chunk of the broadcast stream is not available to be provided to the first client device; and cause an interstitial page to be displayed in place of the additional chunk on the first client device.

* * * * *